United States Patent [19]
Nicholson

[11] Patent Number: 5,245,951
[45] Date of Patent: Sep. 21, 1993

[54] WATER COOLER FOR PETS

[76] Inventor: Charles W. Nicholson, 418 E. 27 St., Winston-Salem, N.C. 27105

[21] Appl. No.: 11,852

[22] Filed: Feb. 1, 1993

[51] Int. Cl.⁵ .................................................. A01K 7/00
[52] U.S. Cl. ..................................... 119/72.5; 222/189
[58] Field of Search .......................... 119/72.5, 73, 18; 222/189, 131

[56] References Cited

U.S. PATENT DOCUMENTS

| | | |
|---|---|---|
| 84,482 | 12/1868 | Downes . |
| 577,965 | 3/1897 | Major . |
| 1,048,766 | 12/1912 | Tucker .............................. 222/189 |
| 1,402,953 | 1/1922 | Pagel . |
| 2,509,736 | 10/1946 | Jaffa ............................... 280/87.01 |
| 2,745,755 | 5/1956 | Anderson ............................ 215/6 X |
| 3,248,016 | 4/1966 | Dahl et al. ........................... 222/189 |
| 3,730,141 | 5/1973 | Manning et al. ..................... 119/51.5 |
| 3,771,496 | 11/1973 | Atchley .............................. 119/72.5 |
| 4,188,914 | 2/1980 | Lage ............................. 119/72.5 X |
| 4,393,813 | 7/1983 | Sou ................................... 119/72.5 |
| 4,787,337 | 11/1988 | Mayer ................................ 119/18 |

*Primary Examiner*—Gene Mancene
*Assistant Examiner*—Thomas Price
*Attorney, Agent, or Firm*—Dowell & Dowell

[57] ABSTRACT

A cool water dispenser for animals which includes an insulated container having a dispensing nozzle mounted to the lower end thereof and which includes an intermediate porous baffle for supporting cubes of ice so the ice will not block or interfere with the dispensing nozzle.

12 Claims, 1 Drawing Sheet

WATER COOLER FOR PETS

BACKGROUND OF THE INVENTION

1. Field of the Invention

This invention is generally directed to water dispensers for animals and, more specifically, to a water dispenser which is specifically designed to retain cubes of ice to provide a continuous source of cool water to pets during periods when the ambient temperature is in a range which is uncomfortable for the animals and wherein the ice is prevented from interrupting or blocking the dispensing nozzles associated therewith.

2. History of the Related Art

It is important that pet owners insure their animals are adequately supplied fresh water, not only to protect the animal's health but also to insure the animal's comfort. In many instances, water is made available only upon demand, that is, only when the animal activates a dispenser to obtain water. Normally, such dispensers include containers having flow control nozzles which include ball valves which are operable by the animal licking on the nozzle thereby unseating the valves allowing water to be dispensed. An example of such a dispenser is disclosed in U.S. Pat. No. 3,771,496.

Although demand actuated water dispensers provide water necessary for an animal's health, many pet owners would like to make sources of cool water available for the comfort of their pets during periods of high ambient temperature. To do this, it is necessary to provide some means of cooling the water which is both practical and economical. Unfortunately, the various types of dispensers which utilize dispensing nozzles which are actuated by an animal are not designed or constructed to provide an adequate supply of cool water.

SUMMARY OF THE INVENTION

This invention is directed to a cool water dispenser for animals which includes an insulated container having a dispensing nozzle mounted to the lower end thereof and a cap at the upper end thereof which may be removed for introducing fresh water and a quantity of ice into the container. The dispenser further includes an internal baffle which is mounted across the full width of the container adjacent the lower end thereof. The baffle is mounted at an acute angle with respect to the longitudinal axis of the container. The baffle is utilized to support blocks or cubes of ice in spaced relationship from the nozzle. The baffle includes a plurality of small holes through which fluid may flow to the dispensing nozzle. The dispenser is designed to be supported by a hanger of conventional design to a support such as the mesh of a cage so that the dispensing nozzle is situated at a height within the cage which is easily reached by an animal.

The nozzle of the dispenser is designed to provide fluid only upon demand. Thus, the nozzle includes a valve, such as a ball, which is situated within the tip of the nozzle which ball is seated against the tip of the nozzle until the animal pushes it forward to thereby allow fluid to be discharged around the ball and from the nozzle.

It is the primary object of the present invention to provide an insulated water dispenser for pets which provides a source of cool water and which includes an internal baffle which supports cubes of ice within the dispenser in such a position that the ice will not block or interfere with the dispensing nozzle associated therewith.

It is also an object of the present invention to provide a cool water dispenser for animals which includes an internal baffle for cubes of ices wherein the baffle has a plurality of holes therein and wherein the baffle is angled relative to the elongated axis of the dispenser so as to facilitate the passage of air bubbles passing upwardly through the dispenser through the dispensing nozzle.

It is another object of the present invention to provide for the health and comfort of pets and other animals by enabling cool water to be dispensed to the animals during periods of high ambient temperatures.

DESCRIPTION OF THE PREFERRED EMBODIMENT

Figure 1:
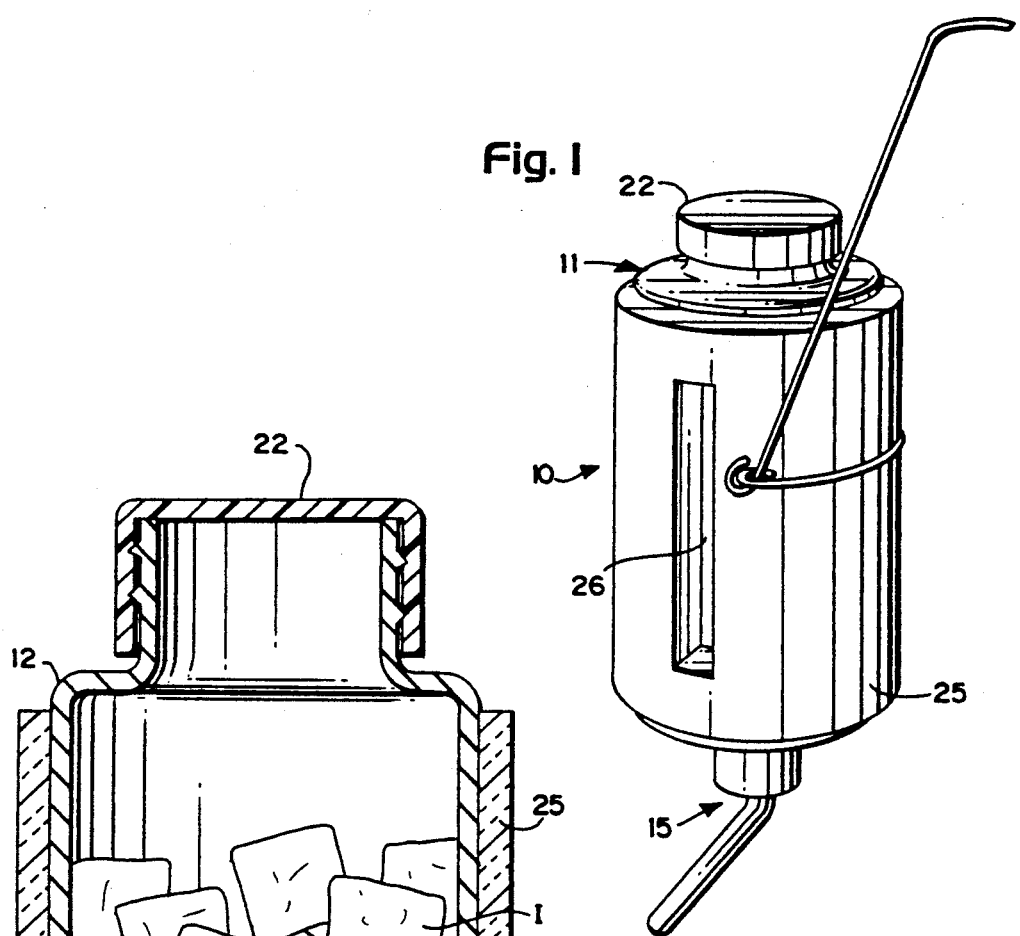
FIG. 1 is a perspective view of the water cooler and dispenser of the present invention.
Figure 2:
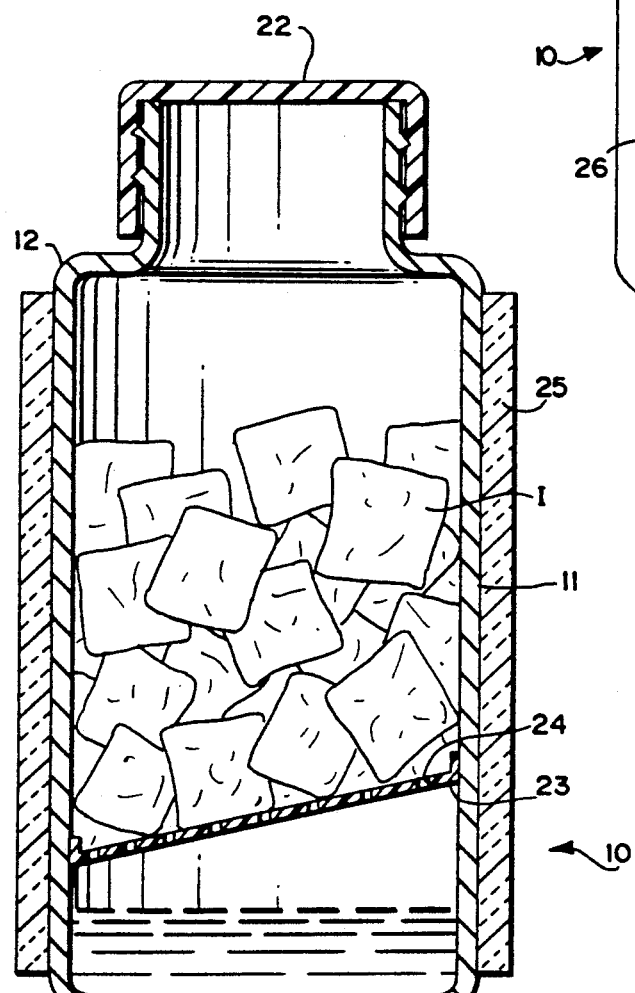
FIG. 2 is an enlarged cross sectional view of the water cooler and dispenser of FIG. 1.

With continued reference to the drawings, the cool water dispenser 10 of the present invention is shown as including a container 11 having an upper portion 12 and a lower portion 13. The lower portion 13 includes a threaded outlet 14 to which a dispensing nozzle assembly 15 is threadingly engaged. The nozzle assembly includes a plug 16 which is seated within the outlet 14 to thereby seal the outlet.

The nozzle assembly also includes a threaded base portion 17 from which an elongated nozzle 18 extends. The tip portion 19 of the nozzle is open and is normally blocked by a moveable ball valve 20 mounted within a passageway 21 defined by the nozzle. The tip of the nozzle is configured so that the ball valve is seated to close the opening unless pushed forwarded or upwardly by an animal desiring to obtain water from the container.

The upper portion 12 of the container is closed by a lid 22 which may be either threadingly or frictionally engaged therewith. Mounted internally of the container and adjacent the lower end portion thereof is a baffle plate 23. The container and is mounted at an acute angle with respect to the horizontal. The baffle plate should be mounted so as to extend at an acute angle of at least 15° with respect to the horizontal and preferably between 20° to 30°. Lesser angular placement can create problems with the effective operation of the dispenser and greater angular placement would severely restrict the quantity of ice which may be retained within the container.

The baffle plate includes a plurality of small holes 24 therethrough for purposes of allowing the passage of fluid downwardly towards the nozzle assembly 15 while allowing air bubbles to move upwardly in the container as liquid is dispensed. The baffle plate serves as a support for cubes or chunks of ice "I" which are placed within the upper portion of the container. The baffle plate insures that the ice is spaced from the nozzle assembly 15 so that it will not interfere with or block the passageway 21 which would cause an interruption of the water supply. Liquid within the container will pass through the holes 24 in the baffle plate downwardly to the discharge nozzle, however, the holes are small enough so as to insure that only ice particles smaller than the diameter of the passageway 21 are permitted to pass therethrough.

The angular disposition of the baffle plate within the container is necessary to promote equalization of air pressure as liquid is dispensed from the container. As an animal drinks and water passes through the opening in the tip of the dispensing nozzle, air bubbles will be created which will rise upwardly through the liquid within the container. If the baffle plate is mounted horizontally with respect to the container, air bubbles can become trapped against the lower surface thereof intermediate the holes 24. However, by sloping the baffle plate, air bubbles engaging the lower surface will traverse upwardly along the lower surface until a hole is encountered, afterwhich, the air bubbles will pass through the hole and rise to the upper portion of the container, thus equalizing pressure therein. If the bubbles were allowed to be trapped underneath the baffle plate, a situation could be created where sufficient vacuum is created to prevent proper discharge of fluid from the container.

Although the walls of the container may be made of insulated material, in order to reduce cost and to allow for sight inspection of the contents of the container, the container is preferably constructed of a clear plastic or glass material which is covered by an insulating jacket 25. The jacket is placed about the container and extends from the upper portion to the lower portion thereof. The insulating jacket may be made of any type of good quality thermal insulating material and especially one which may be relatively easily frictionally mounted to the container by sliding the material over the container. In some instances, it may be desired to create an open window 26 in the insulation so as to allow a visual inspection to be made of the contents of the container so that if additional ice or water is required, it would be readily apparent to someone taking responsibility for maintaining the container.

I claim:

1. A cold water dispenser for animals comprising, a container having upper and lower ends, a dispensing nozzle assembly mounted to said lower end, said nozzle assembly including a passageway having a first diameter, baffle means within said container for supporting chunks of ice in spaced relationship from said nozzle assembly, said baffle means being inclined across said container, and a plurality of holes through said baffle means whereby ice placed on said baffle means is retained in assembly so that cool water is dispensed from the dispenser without being obstructed by the ice.

2. The dispenser of claim 1 including an insulating sleeve means mounted in generally surrounding relationship with the container.

3. The dispenser of claim 2 in which said baffle means is inclined at an angle of at least 15° from a horizontal plane taken perpendicular to an elongated axis of the container.

4. The dispenser of claim 3 including an elongated opening in said insulating sleeve means for providing visual indication of the contents of the container.

5. The dispenser of claim 4 in which said holes are smaller than said first diameter of said passageway.

6. The dispenser of claim 5 including a ball valve means mounted within said passageway of said nozzle assembly.

7. The dispenser of claim 1 in which said holes are smaller than said first diameter of said passageway.

8. The dispenser of claim 7 in which said container is made of a transparent material and an insulating sleeve means mounted in surrounding relationship with the container.

9. The dispenser of claim 8 including an elongated opening in said insulating sleeve means for providing visual indication of the contents of the container.

10. The dispenser of claim 9 in which said baffle means is inclined at an angle of at least 15° from a horizontal plane taken perpendicular to an elongated axis of the container.

11. The dispenser of claim 1 in which said baffle means is inclined at an angle of at least 15° from a horizontal plane taken perpendicular to an elongated axis of the container.

12. The dispenser of claim 11 in which said container is made of transparent material and an insulating sleeve means mounted in surrounding relationship with the container.

* * * * *